United States Patent
Salter et al.

(10) Patent No.: US 12,049,250 B2
(45) Date of Patent: Jul. 30, 2024

(54) VEHICLE HAVING STEERING WHEEL DEPLOYABLE AS AN ASSIST HANDLE

(71) Applicant: Ford Global Technologies, LLC, Dearborn, MI (US)

(72) Inventors: Stuart C. Salter, White Lake, MI (US); Brendan Diamond, Grosse Pointe, MI (US); Taras Palczynski, Ann Arbor, MI (US); Erik William Soderlind, Harrison Township, MI (US); James Robert Chascsa, II, Farmington Hills, MI (US); Lucretia Williams, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 17/852,611

(22) Filed: Jun. 29, 2022

(65) Prior Publication Data

US 2024/0001983 A1    Jan. 4, 2024

(51) Int. Cl.
| | |
|---|---|
| *B62D 1/04* | (2006.01) |
| *B62D 1/181* | (2006.01) |
| *B62D 1/187* | (2006.01) |
| *G06V 20/58* | (2022.01) |
| *G06V 40/10* | (2022.01) |

(52) U.S. Cl.
CPC .............. *B62D 1/187* (2013.01); *B62D 1/04* (2013.01); *B62D 1/181* (2013.01); *G06V 20/58* (2022.01); *G06V 40/10* (2022.01)

(58) Field of Classification Search
CPC ............ B62D 1/04; B62D 1/181; B62D 1/187
See application file for complete search history.

(56) References Cited

U.S. PATENT DOCUMENTS

| | | | |
|---|---|---|---|
| 11,072,359 B2* | 7/2021 | Murray | B62D 1/184 |
| 2007/0112492 A1 | 5/2007 | Hyodo et al. | |
| 2014/0028008 A1* | 1/2014 | Stadler | B62D 1/192 |
| | | | 280/777 |
| 2017/0334383 A1* | 11/2017 | Paxton | B60R 21/0136 |
| 2018/0244175 A1* | 8/2018 | Tan | B60N 2/0248 |
| 2019/0071113 A1* | 3/2019 | Board | B62D 1/14 |
| 2021/0031823 A1* | 2/2021 | Watanabe | B62D 1/183 |
| 2022/0063448 A1 | 3/2022 | Munoz Perez et al. | |

FOREIGN PATENT DOCUMENTS

| | | |
|---|---|---|
| DE | 102017201357 A1 | 8/2018 |
| FR | 3100521 A1 | 3/2021 |

* cited by examiner

*Primary Examiner* — Long T Tran
(74) *Attorney, Agent, or Firm* — Vichit Chea; Price Heneveld LLP (57) ABSTRACT

A vehicle includes a cabin interior, a steering wheel assembly comprising a steering column, a steering wheel and an actuator configured to move the steering handle amongst a plurality of positions, and at least one sensor for sensing a user proximate to the vehicle and generating sensed data based on the sensed user. The vehicle also includes a controller determining one or more characteristics of the user from the sensed data and controlling the actuator to actuate the steering wheel to one of the plurality of positions based on the determined one or more characteristics of the user.

14 Claims, 8 Drawing Sheets

VEHICLE HAVING STEERING WHEEL DEPLOYABLE AS AN ASSIST HANDLE

FIELD OF THE DISCLOSURE

The present disclosure generally relates to a vehicle having assist handles, and more particularly relates to a vehicle having a movable steering wheel.

BACKGROUND OF THE DISCLOSURE

Automotive vehicles are commonly equipped with a steering wheel and handle structures referred to as passenger assist handles for passengers to grasp with their hand when entering and exiting the vehicle. Assist handles and the steering wheel are typically fixed in the vehicle. It may be desirable to provide for a steering wheel that may be used as an assist handle at different positions.

SUMMARY OF THE DISCLOSURE

According to a first aspect of the present disclosure, a vehicle is provided that includes a cabin interior, a steering wheel assembly comprising a steering column, a steering wheel and an actuator configured to move the steering handle amongst a plurality of positions, and at least one sensor for sensing a user proximate to the vehicle and generating sensed data based on the sensed user. The vehicle also includes a controller determining one or more characteristics of the user from the sensed data and controlling the actuator to actuate the steering wheel to one of the plurality of positions based on the determined one or more characteristics of the user.

Embodiments of the first aspect of the present disclosure can include any one or a combination of the following features:
- the steering wheel is actuatable towards and away from a door opening of the vehicle;
- the steering wheel is actuatable towards a driver's door proximate to a driver seat to assist a driver entering the vehicle;
- the steering wheel is actuatable towards a passenger door to provide an assist handle to assist a passenger entering the vehicle;
- the steering wheel is actuatable along a lateral axis of the vehicle;
- the actuator comprises a motor;
- the steering wheel is further actuatable to rotate laterally relative to the steering column;
- the steering wheel rotates approximately 90° about a vertical axis;
- the steering wheel is further actuatable to move longitudinally along an axis of the steering column and tilt about the lateral axis to move the steering wheel to positions at different heights;
- the determined one or more characteristics of the user include one or more measured dimensions of the user;
- the one or more measured dimensions of the user include length of an arm of the user;
- the at least one sensor comprises at least one imaging camera; and
- the at least one imaging camera captures images of a user proximate to the vehicle and the controller processes the images and determines the characteristics of the user from the images.

According to a second aspect of the present disclosure, a vehicle is provided that includes a cabin interior, a door defining a door opening in an open position, a steering wheel assembly comprising a steering column, a steering wheel and an actuator to move the steering wheel amongst a plurality of positions, and at least one sensor for sensing the user proximate to the vehicle and generating sensed data based on the sensed user. The vehicle also includes a controller determining one or more characteristics of the user from the sensed data and controlling the actuator to actuate the steering wheel to one of the plurality of positions based on the determined one or more characteristics of the user, wherein the steering wheel is actuatable along a lateral axis of the vehicle towards and away from the door opening.

According to a third aspect of the present disclosure, a method of positioning a steering wheel in a vehicle is provided. The method includes the steps of providing a steering wheel assembly having a steering wheel configured to be engaged by a user to steer the vehicle, the steering wheel further comprising a steering column and an actuator for actuating the steering wheel into one of a plurality of positions, sensing a user proximate to the vehicle with at least one sensor generating sensed data, determining one or more characteristics of the user from the sensed data, and controlling the actuator to actuate the steering wheel to move to one of the plurality of positions based on the determined one or more characteristics of the user.

Embodiments of the third aspect of the present disclosure can include any one or a combination of the following features:
- the steering wheel is actuatable along a lateral axis of the vehicle;
- the steering wheel is actuatable towards and away from a door opening of the vehicle;
- the steering wheel is actuatable towards a driver's door proximate to a driver seat to assist a driver entering the vehicle;
- the steering wheel is actuatable towards a passenger door to provide an assist handle to assist a passenger entering the vehicle; and
- the steering wheel is further actuated to rotate laterally relative to the steering column.

These and other features, advantages, and objects of the present invention will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
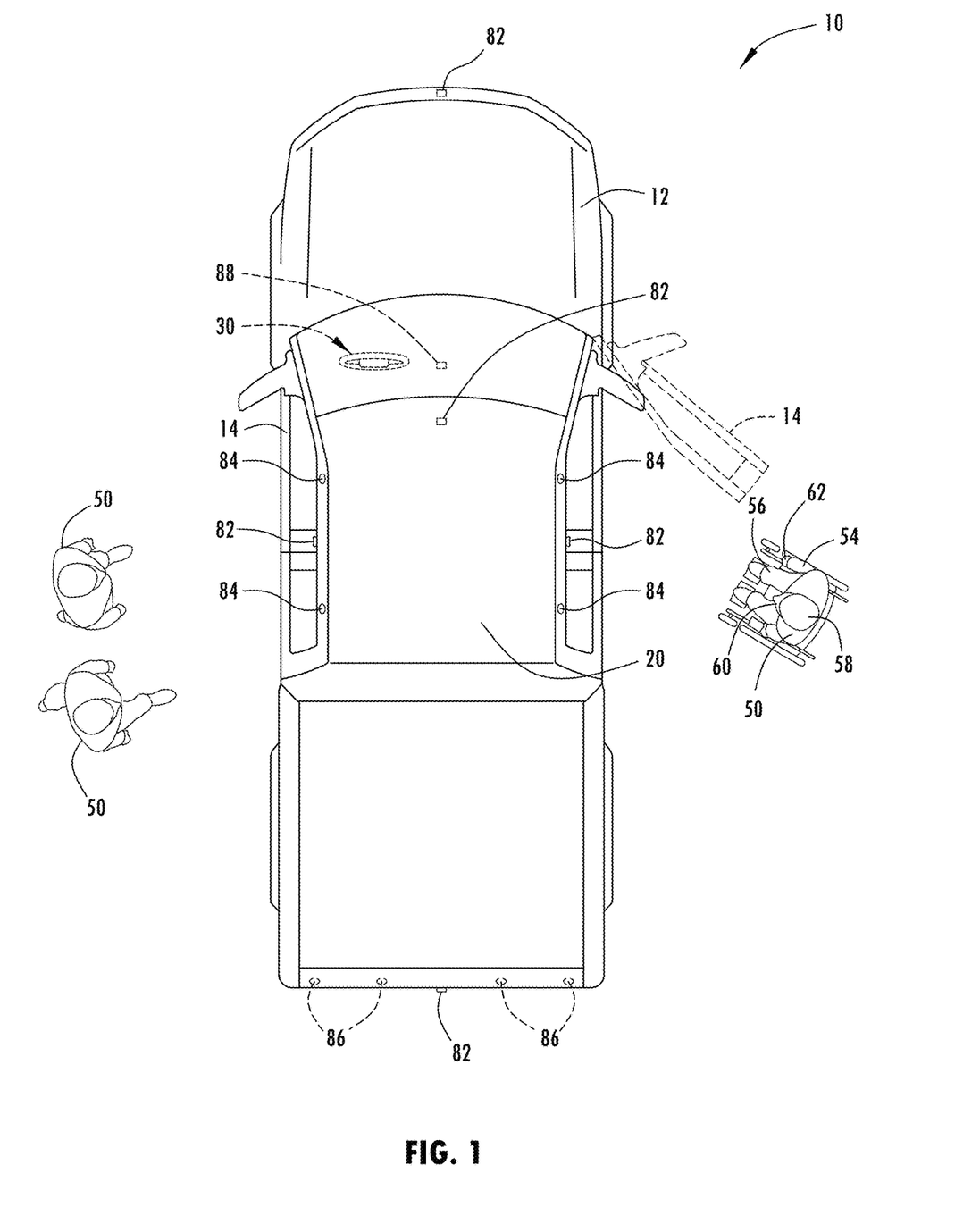
FIG. 1 is a top schematic view of a motor vehicle equipped with a steering wheel assembly and sensors for sensing a user and controlling movement of the steering wheel, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having sensors and a movable steering wheel and method. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
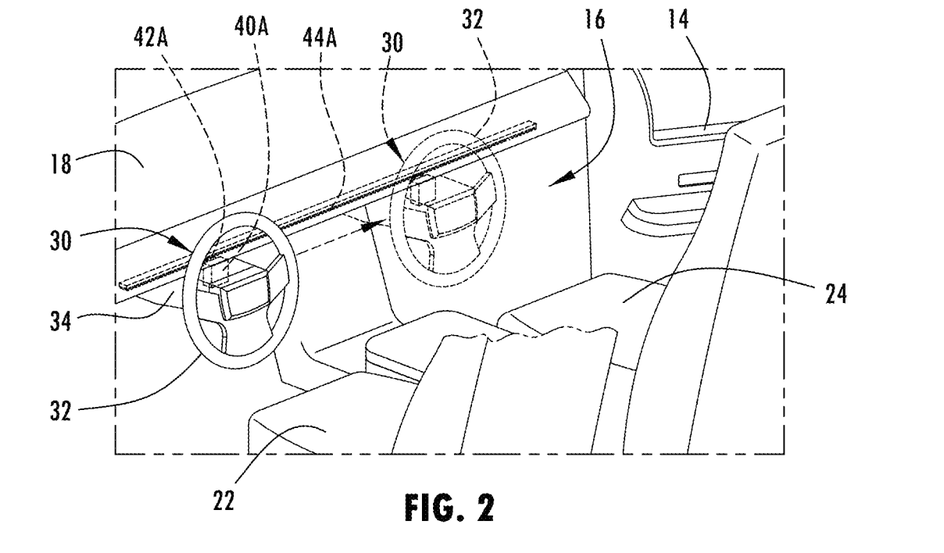
FIG. 2 is a side perspective view of a front portion of the cabin interior of the vehicle illustrating the steering wheel in two positions.

Referring to FIGS. 1 and 2, a wheeled automotive or motor vehicle 10 is generally illustrated having a cabin interior 16 defined by a vehicle body 12 and configured with passenger seating including at least a driver seat 22 and passenger seat 24 for transporting a driver and passenger in the vehicle 10. The cabin interior 16 is generally defined by the vehicle body 12 which may include one or more doors 14 and a roof 20 on the top side. The arrangement of seats includes the driver seat 22 forward of a steering wheel assembly 30 and a passenger seat 24 both on opposite lateral sides in a front row. The vehicle 10 may include one or more rear seats defining additional rows of seating. The driver and passenger seats 22 and 24 are generally aligned with a corresponding door 14 on each side to allow ingress and egress to the vehicle cabin interior 16.

The vehicle 10 further includes a dashboard 18 generally extending across the front region of the cabin interior 16. The dashboard 18 may also be referred to as an instrument panel and may contain electronic instruments. As such, the dashboard 18 is typically located at the front end of the cabin interior 16 rearward of a front windshield. Located forward of the driver seat 22 and connected or proximate to the dashboard 18 is the steering wheel assembly 30. The steering wheel assembly 30 has a steering wheel 32 and a steering column 34 connected thereto and extending from the dashboard 18 or below the dashboard 18. The steering wheel assembly 30 may be configured as a steer-by-wire steering wheel assembly, according to one embodiment. As a steer-by-wire steering wheel assembly, the steering wheel 32 does not require a direct mechanical linkage with the vehicle wheels, but instead employs one or more sensors to sense the position and the rotation clockwise or counterclockwise of the steering wheel 32 and actuators to actuate the vehicle wheels. As such, the steering wheel 32 may be moved to different locations and still function to provide a steering input to steer the vehicle wheels.

Figure 2A:
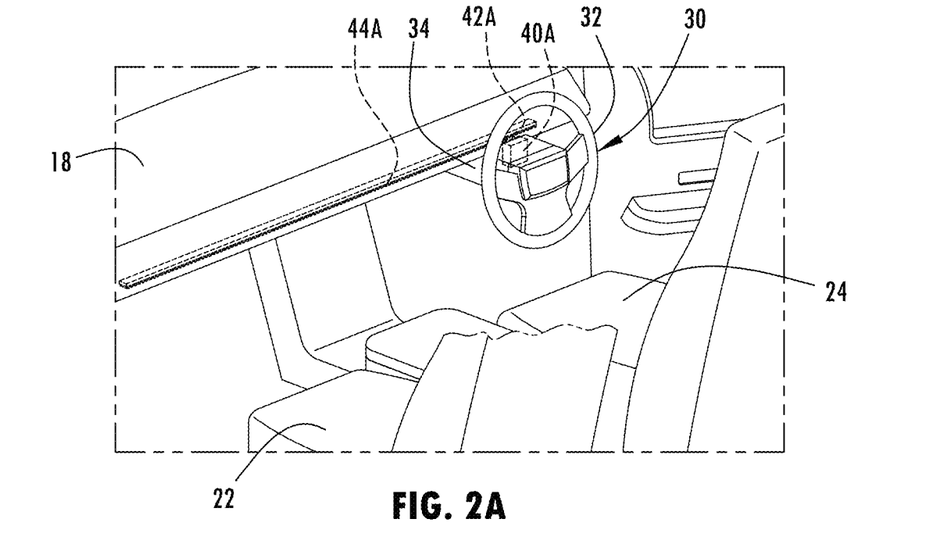
FIG. 2A is a side perspective view of the front portion of the cabin interior showing the steering wheel moved to a position forward of a passenger seat.

The steering wheel 32 may be engaged by a driver seated in the driver seat 22 and rotated about an axis extending into the steering column 34 to steer the vehicle wheels and hence the vehicle 10 as is readily apparent to one in the art. The steering wheel 32 may further be actuatable into various different positions. For example, the steering wheel 32 may be actuated to translate laterally to various lateral positions to provide an assist handle for assisting with ingress and egress of an occupant into or out of the vehicle 10. For example, the steering wheel 32 may be actuated to a left position closer to the driver door or a right position closer to the passenger door as shown in FIG. 2. In the left position, the steering wheel 32 may assist a user approaching and entering the vehicle 10 from the driver side door. In the right position, a passenger approaching the passenger door may grab the steering wheel 32 as an assist handle to assist with entry into the vehicle 10 from the passenger side as shown in FIG. 2A. The actuation may be achieved with an actuator such as an electric motor 40A coupled to the steering column 34 driving an output shaft and pinion gear 42A with teeth which engages a toothed rack 44A. While a rack and pinion gear is shown in one example, it should be appreciated that other transmission arrangements may be employed.

Figure 3:
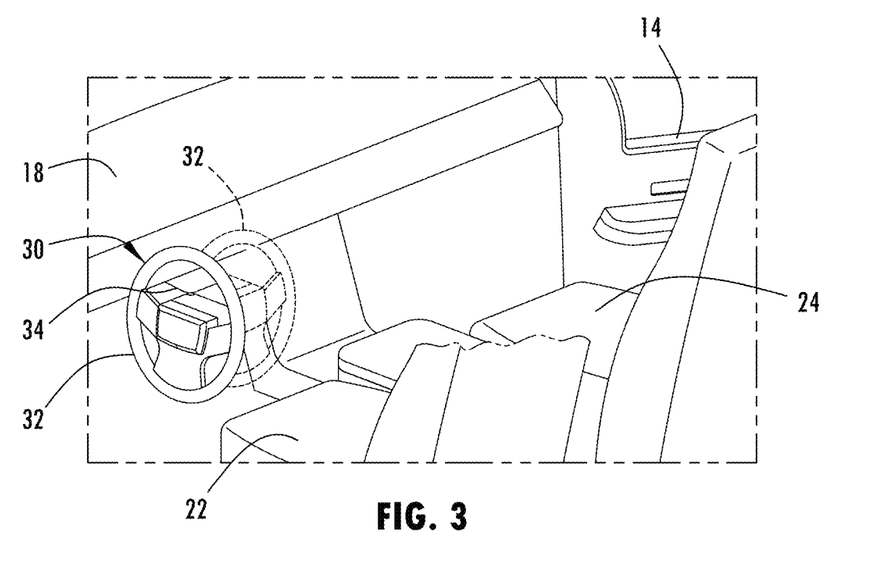
FIG. 3 is a side perspective view of the cabin interior further illustrating the steering wheel rotatable about a vertical axis in a laterally rotated position and a non-rotated position.
Figure 3A:
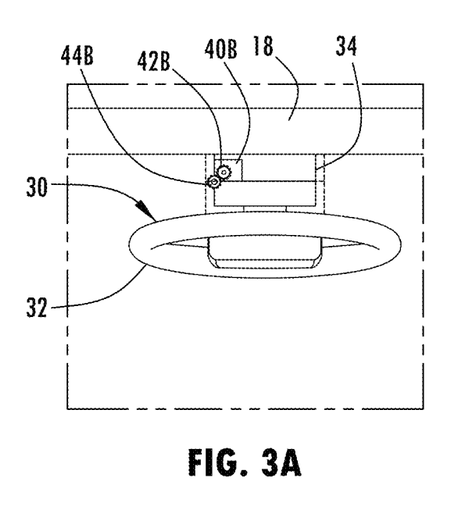
FIG. 3A is a top view of the steering wheel shown in the normal non-rotated position in FIG. 3.
Figure 3B:
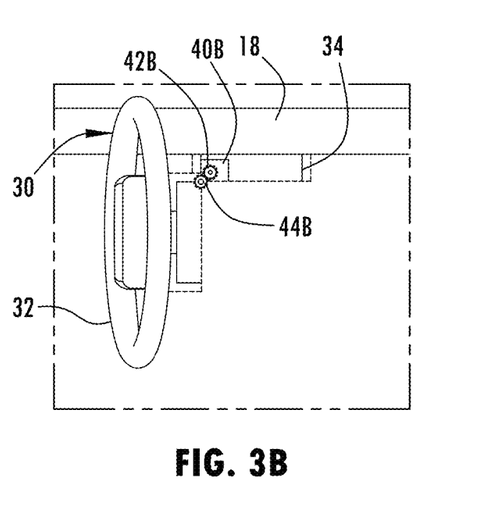
FIG. 3B is a top view of the steering wheel shown in the laterally rotated position in FIG. 3.

In addition, the steering wheel 32 may rotate about a vertical axis as shown in FIGS. 3, 3A and 3B. This may be achieved by the steering wheel 32 being pivotally connected to the steering column 34 via gears to pivot laterally about one side. The pivoting actuation may be achieved with an actuator such as an electric motor 40B driving an output shaft gear 42B which engages a worm gear 44B, for example. It should be appreciated that other transmissions may be employed according to other examples. With the steering wheel 32 in the pivoted position by about 90°, the steering wheel 32 presents an assist handle to allow a user to enter the vehicle 10.

Figure 4:
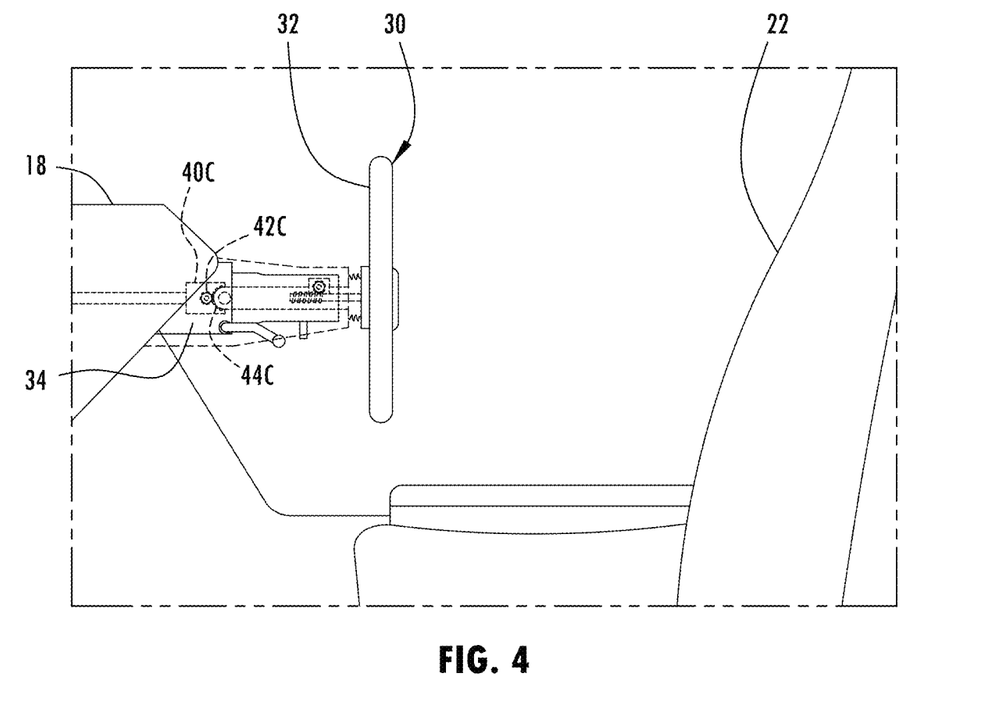
FIG. 4 is a side view of the cabin interior showing the steering wheel in a driver use position.
Figure 4A:
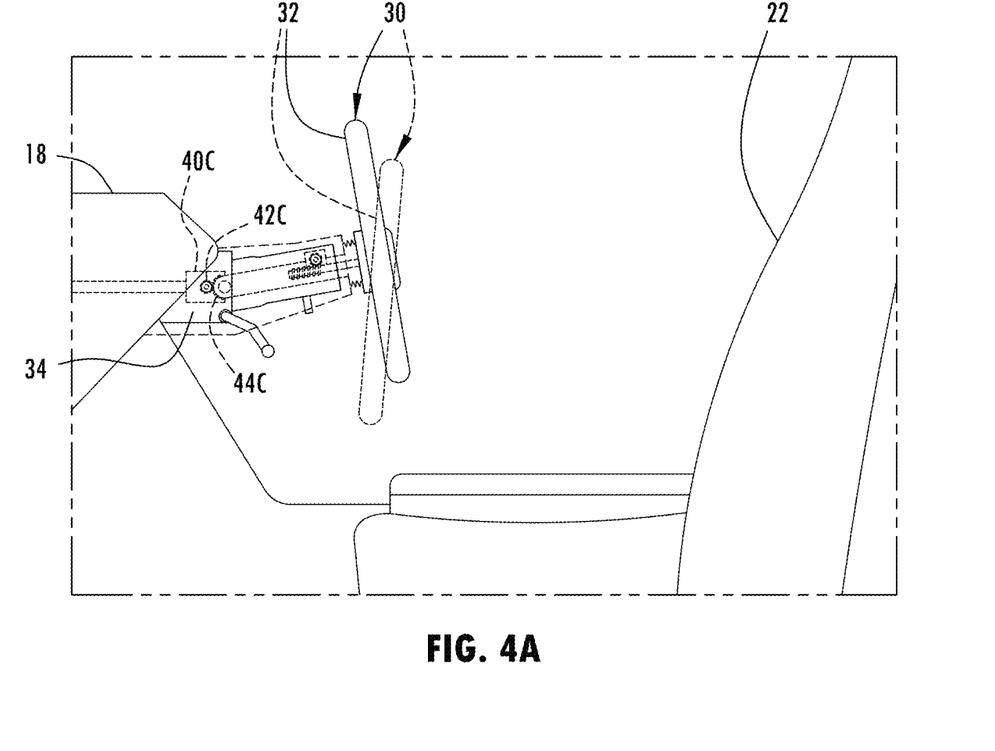
FIG. 4A is a side view of the cabin interior showing the steering wheel in a tilted position.

Referring to FIGS. 4 and 4A, the steering wheel 32 may be adjusted in the tilt angle about a lateral axis. This may allow the steering wheel 32 to be adjusted to different positions or to allow the steering wheel 32 to be stowed or folded when the vehicle 10 is not in use. The tilt may be achieved with the use of an actuator such as an electric motor 40C driving an output shaft gear 42C which engages a worm gear 44C, for example. It should be appreciated that other transmissions may be employed according to other examples.

Figure 5:
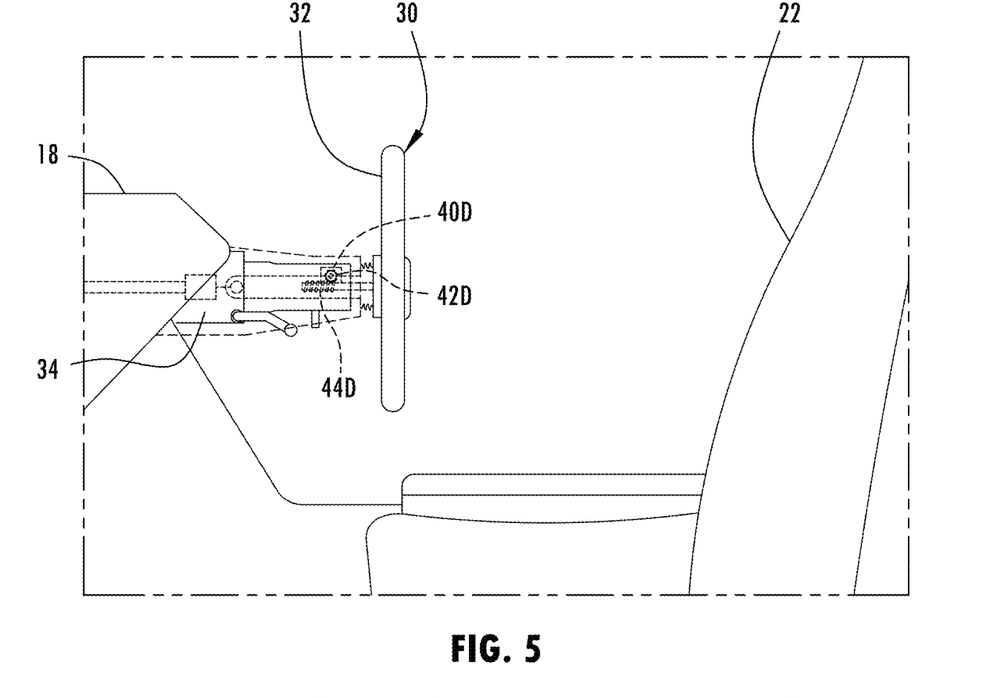
FIG. 5 is a side view of the cabin interior showing the steering wheel in a stowed position.
Figure 5A:
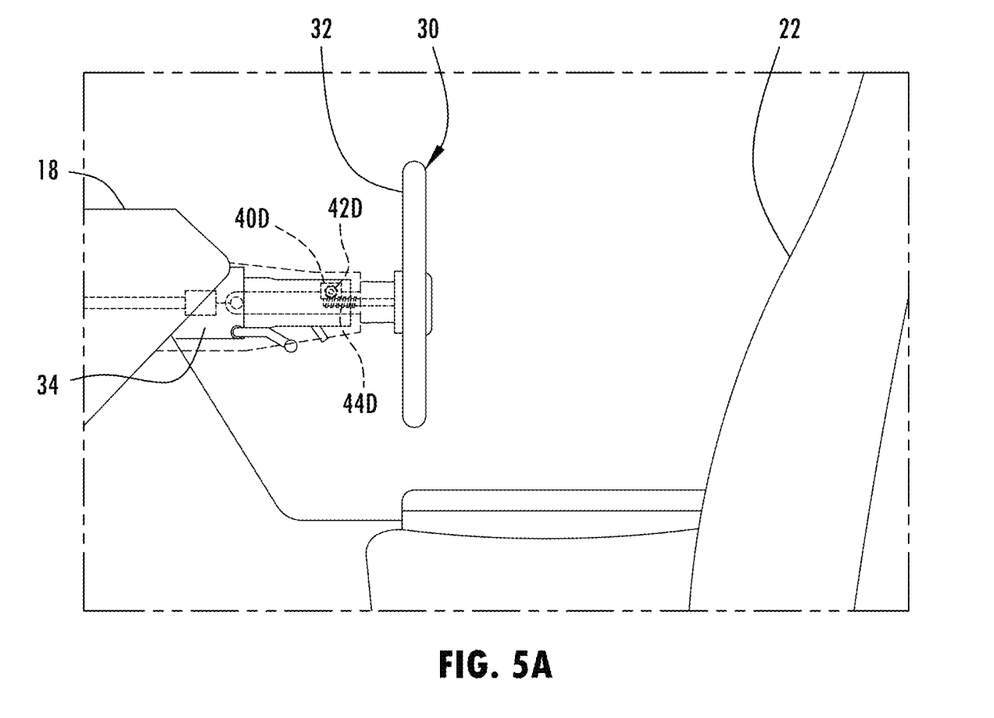
FIG. 5A is a side view of the cabin interior showing the steering wheel in an extended position.
Figure 6:
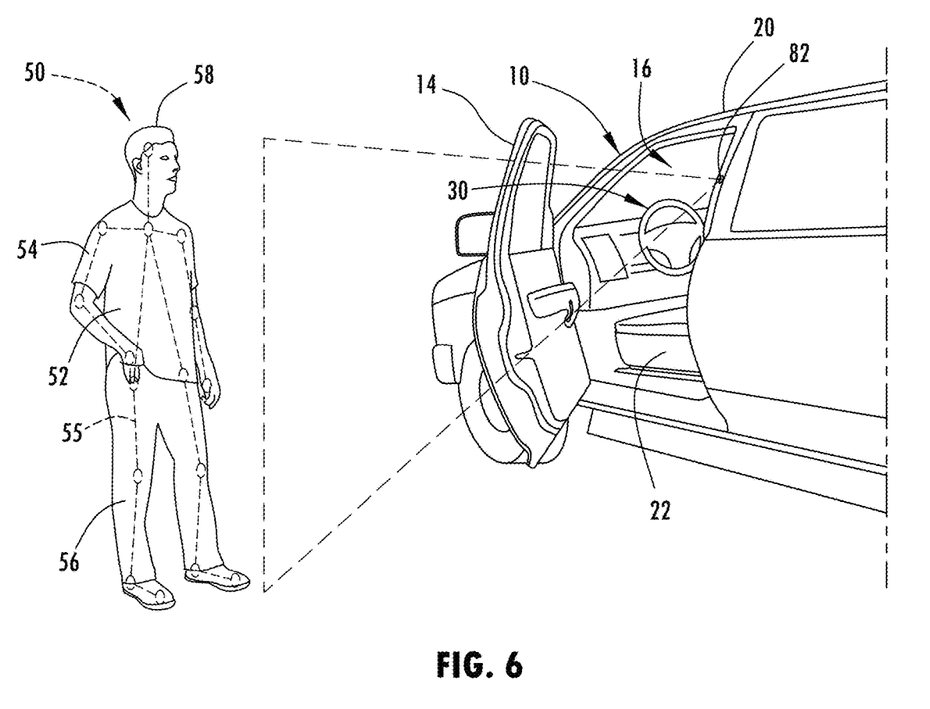
FIG. 6 is a side perspective view of the exterior of the vehicle illustrating an open door and the steering wheel as a user approaches the vehicle.
Figure 7A:
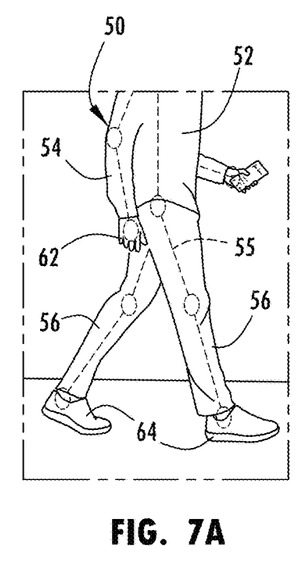
FIG. 7A is a captured image of a user/person showing a lower body gait including the legs and mid-torso, according to one example.
Figure 7B:
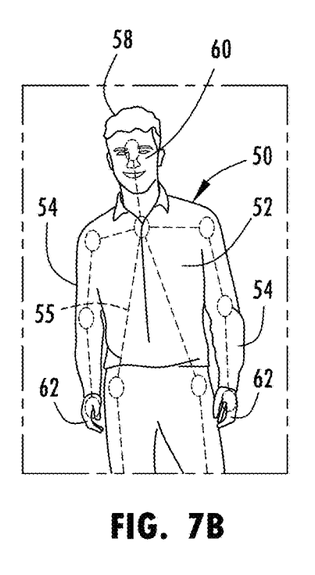
FIG. 7B is a captured image of the front upper portion of a user/person showing the upper body gait including the head with face and torso, according to another example.
Figure 7C:
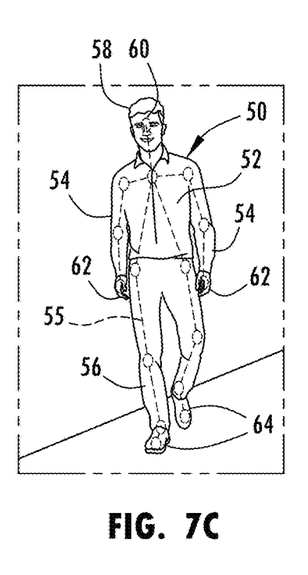
FIG. 7C is a captured image of a user/person showing the entire body of the user as the user approaches the vehicle, according to a further example.

Referring to FIG. 5, the steering wheel 32 may be movable into and out of the steering column 34. For example, the steering wheel 32 may be retracted and stowed inward into the dashboard 18 or steering column 34 to stow the steering wheel 32, particularly when the vehicle 10 is not in use. It should further be appreciated that the steering wheel 32 may be stowed by pushing forward and downward and may further be tilted to put the steering wheel 32 into a stowed non-use position when the vehicle is not operated. The extension and retraction movement may be achieved with an actuator such as electric motor 40D driving an output shaft gear 42D which engages a screw worm 44D, for example. It should be appreciated that other transmissions may be employed according to other examples.

It should be appreciated that the steering wheel 32 may move in other directions. For example, the steering wheel 32 may be rotated about a steering wheel axis similar to a user rotating the steering wheel 32 to turn the steering wheels to make a turn but with the use of an actuator such as a motor to position the steering wheel 32 in a desired rotational positon to enable a user's hand to grip the steering wheel. The steering wheel 32 can also be completely stowed away to allow more space for a user to enter or exit the vehicle 10.

It should further be appreciated that the steering wheel 32 may advantageously be employed as an assist handle that may be positionable to enable a user, such as a driver or passenger, to engage and grip the steering wheel 32 with a hand for support while entering the vehicle 10, exiting the vehicle 10 or for support while traveling in the vehicle 10. For example, a driver or passenger may reach and grip the steering wheel 32 in a position that is advantageously placed closer to the user such as towards the open door 14 when entering or exiting the vehicle 10. As such, the steering wheel 32 may serve as an assist handle for purposes of maintaining balance and stability and support while entering and leaving the vehicle 10.

The steering wheel 32 is a deployable or movable steering wheel that may be actuated amongst one of a plurality of positions, depending on a sensed user and sensed characteristics of the user to provide an assist handle to assist a user when entering or leaving the vehicle 10. The vehicle 10 is equipped with at least one sensor for sensing a user such as a passenger of a driver in the form of a person proximate to the vehicle 10, such as shown in FIG. 1. More specifically, the at least one sensor may sense a user proximate to and approaching the vehicle 10 in an attempt to enter the vehicle 10. The at least one sensor may sense dimensions of the user including height of the user, length of the legs of the user, and length of the arms of the user, for example. In addition, the at least one sensor may sense the gait of the user which is the movement of the user which may be acquired by monitoring a sequence of poses of the user. Further, the at least one sensor may detect the speed of the user approaching the vehicle 10. Based on the sensed characteristics of the user, including height of the user, leg length, arm length, gait of the user and speed of the user, the deployable steering wheel 32 may be actuated to one of a plurality of positions to accommodate the sensed characteristics of the user with enhanced steering wheel placement to enhance the access by the user of the vehicle 10. This may occur when the user approaches and reaches toward the door opening when the door 14 proximate thereto opens. It should be appreciated that the at least one sensor may also sense the user seated in the vehicle 10 and may deploy the deployable steering wheel 32 to one of a plurality of positions at different locations based on the sensed characteristics of the user and when the user reaches for the steering wheel 32 and the door opens.

The vehicle 10 is shown equipped with a plurality of sensors 80 that are located and oriented on the vehicle 10 for sensing objects such as potential users, e.g., driver and passengers. The at least one sensor used to sense characteristics of the user to control the position of the steering wheel 32 may include one or more of the plurality of sensors 80. The sensors which are shown in FIG. 1 may include a plurality of exterior imaging sensors 82, also referred to as cameras, located on the exterior of the vehicle 10. The exterior imaging sensors 82 may acquire images within a space nearby (e.g., within a few meters) and surrounding the vehicle 10, particularly proximate to one or more doors 14 of the vehicle 10. One or more interior imaging sensors 88 may detect a user seated within the vehicle 10 or located within the cabin interior 16. The plurality of exterior imaging sensors include exterior imaging sensors 82 on opposite lateral sides of the vehicle proximate to the side passenger doors, a front exterior imaging camera 82, and a rear exterior imaging camera 82. The interior sensor 88 may include one or more cameras oriented to capture images within the cabin interior 16 including a region where a user may be seated. Imaging sensors 80 may acquire images of zones in the space nearby and around the perimeter of the vehicle 10 and within the vehicle 10. The acquired images may be processed by a controller using video processing to identify objects such as one or more people as potential users and the position and characteristics of the users.

The plurality of sensors 80 may also include a plurality of radar sensors 84 shown located on an exterior of the vehicle 10. In the example shown, four radar sensors 84 are shown located on opposite left and right lateral sides of the vehicle 10 proximate to the passenger side doors. The radar sensors 84 transmit radio waves and process their reflections from one or more objects to determine distance to the object(s), speed of the object, and location of the object(s).

The plurality of sensors 80 may further include a plurality of ultrasonic sensors 86. In the example shown, four ultrasonic sensors 86 are shown located at the rear end of the vehicle 10. The ultrasonic sensors 86 may be used to detect location, size and relative distance from the vehicle 10 to the detected object(s). It should be appreciated that other sensors may be employed on the vehicle 10 to sense objects such as potential users proximate to the vehicle 10 and generate sensed signals that may be used to identify each user and characteristics of the user for use in assisting with controlling the actuator for the deployable steering wheel 32 on the vehicle 10. It should be appreciated that the plurality of sensors 80 may be located at any of a number of locations on the vehicle 10 to detect potential users and acquire characteristics of the users.

Several potential users 50 are illustrated in one example approaching both sides of the vehicle 10 with the front passenger door 14 in the open position in FIG. 1. In this example, the one user 50 is illustrated on the passenger side is a physically challenged or handicapped person seated in a wheel chair. The user 50 may require assistance to enter the vehicle 10 such as with the use of the steering wheel 32. One or more of the other users on the driver side may also utilize the steering wheel 32 to assist with entry to the vehicle 10.

In this scenario, the at least one sensor, such as the exterior imaging camera 82 detects each user 50 and acquires sensed characteristic data that may be processed including dimensions of the user such as height, leg length and arm length, gait of the user 50 and speed of the user 50. In addition, the sensed characteristic data may include detecting that the user 50 is seated in a wheelchair or otherwise physically challenged. As shown in FIGS. 6 and 7A-7C, certain characteristics of the user 50 may be detected. An image processor associated with the controller may process the acquired images of the user 50 to determine certain characteristics such as physical size, posture, gait, and direction of the face 60 of user 50. The image processing may process the images of the person as the user 50 to determine dimensions of the user, such as the height of the user from the user's feet to the top of the head 58, the length of the arms 54 and arm reach distance of the user 50, and the length of the legs 56 of the user 50. The image processing may further determine a size of the torso 52 of the user 50 and position and/or height of the arms 54 and hands 62 of the user 50. The image processing may determine the bone structure of the user's arm 54 as shown by lines 55 and may determine an estimated pose of the user from the bone structure. The image processing may monitor the movement of the user 50 as the user 50 approaches the vehicle 10. From the monitored movement of the user 50, the image processing may determine the gait of the user from estimated poses and, with the use of radar or other sensors, may determine the speed of the user approaching the vehicle 10. If the speed is slow, this may be an indication of a user with slow or limited mobility that may need the steering wheel 32 extended further outward and/or to a lowered height. As a user approaches the vehicle 10, the deployable steering wheel 32 may be moved to one of a plurality of different positions determined based on the sensed characteristics of the user. For example, if the user is shorter, or has a short arm reach, or has a slow gait and smaller body dimensions, the steering wheel 32 may be deployed outward and to a first lowest extended position. If the user is taller and more active, the deployable assist handle may be deployed more inward and to a second higher extended position. As such, an optimal position of the steering wheel 32 may be determined and the steering wheel 32 extended to a position for optimal presentation for ease and entry and exiting of the vehicle 10.

The image processing may determine if a user is in a seated position, such as seated in a wheelchair, or on another type of seat or whether the user is assisted with crutches or a cane or otherwise requiring assistance and may use that determination to control the position of the steering wheel 32 to move to a suitable position. The image processing may further determine if the user is elevated, such as, for example, standing on a curb or step, and may take that into account when adjusting the position of the steering wheel 32.

Figure 8:
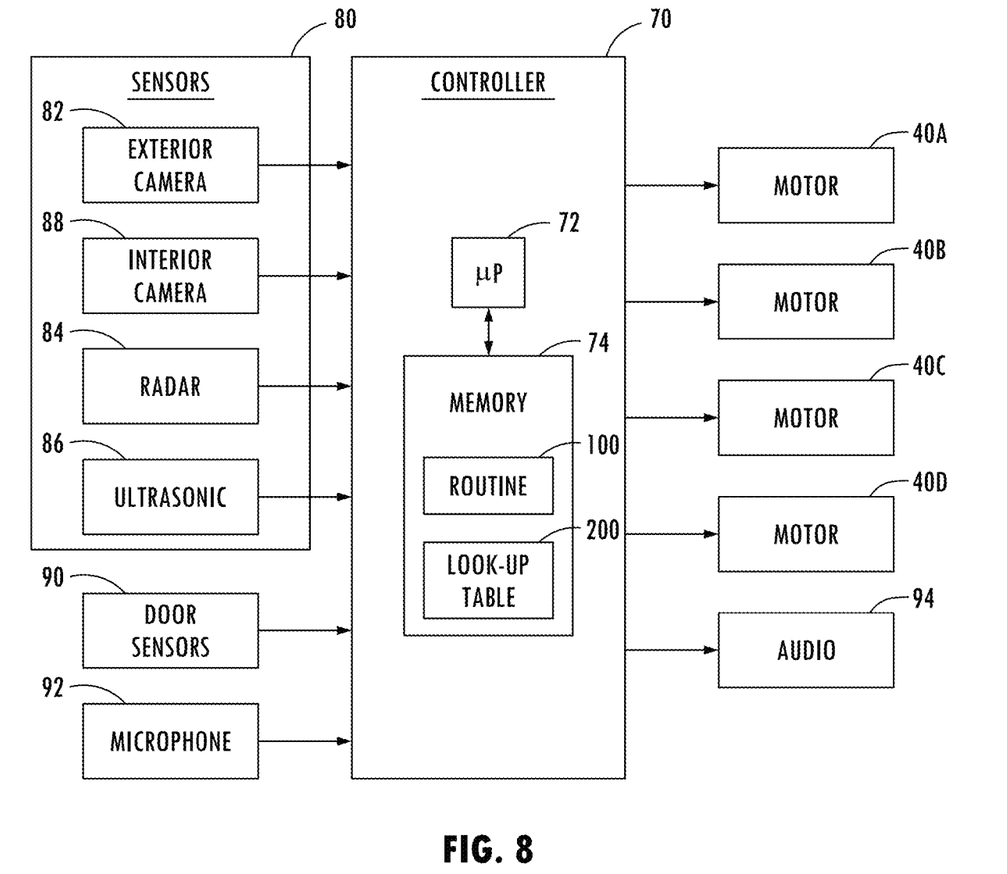
FIG. 8 is a block diagram of a vehicle controller configured to detect user characteristics and control movement of the steering wheel into one of multiple positions, according to one embodiment.

Referring to FIG. 8, the vehicle 10 is shown having a controller 70 that monitors various inputs from the sensors 80, including from the imaging sensors 82 and 88, radar 84, and ultrasonic sensors 86 and generates output signals that are processed by the controller 70 to control the actuators shown as motors 40A, 40B, 40C and 40C associated with the steering wheel 32. The controller 70 may also receive sensed signals from door sensors 90 associated with the vehicle doors which may indicate open or closed door positions. In addition, the controller may receive user voice commands via a microphone 92. The controller 70 may include control circuitry, such as a microprocessor 72 and memory 74. It should be appreciated that the controller 70 may be a dedicated or shared controller and may be comprised of analog and/or digital control circuitry. Stored in memory 74 are one or more control routines including routine 100 which may be executed by the microprocessor 72. In addition, one or more lookup tables 200 may be stored in memory 74 and processed by the microprocessor 72. The lookup tables 200 may include tables of stored data that provide steering wheel positions based on sensed characteristics such as height of the user, leg length of the user, arm length of the user, gait of the user, and speed of the user, for example. The controller 70 processes the various inputs to detect characteristics of a user and actuates one or more of the motors 40A, 40B, 40C and 40D to control the position of the steering wheel 32 to present the steering wheel 32 at an optimal position and assist a user in entering or exiting the vehicle 10. The controller 70 may also output audible sounds or messages via audio output 94. For example, a user may verbally input commands to control the position of the steering wheel 32.

Figure 9:
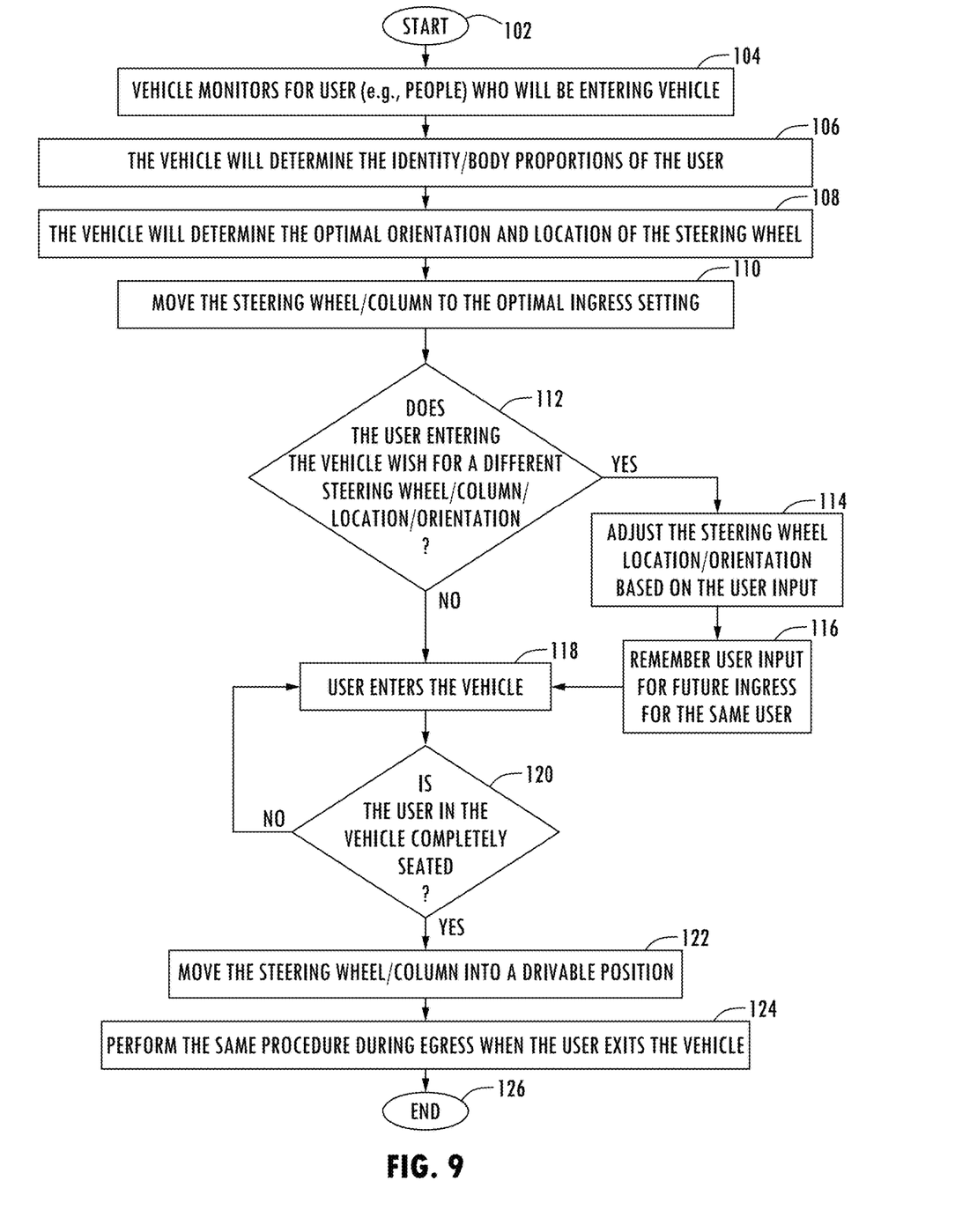
FIG. 9 is a flow diagram illustrating a routine for sensing a user's characteristics and controlling the movement of the steering wheel, according to one example.

Referring to FIG. 9, the control routine 100 is illustrated, according to one example. Control routine 100 begins at step 102 and proceeds to step 104 where the vehicle monitors for users who will be entering the vehicle. Next, at step 106, routine 100 determines the identity or body characteristics of a user such as either a front passenger or driver of the vehicle. Next, at step 108, routine 100 will determine the optimal orientation and location of the steering wheel before proceeding to step 110. At step 110, control routine 100 will move the steering wheel and/or steering column to the optimal setting to allow for ingress of the user into the vehicle 10. At decision step 112, routine 100 will determine whether the user entering the vehicle desires a different steering wheel location or orientation. If a different steering wheel location or orientation is desired, routine 100 proceeds to step 114 to adjust the steering wheel location or orientation based on the user input and to step 116 to remember the user input for future ingress to the vehicle for the same user. Next, or if the user does not desire a different steering wheel location or orientation, routine 100 proceeds to step 118 where the user enters the vehicle and then to decision step 120 where the control routine determines via the interior camera if the users in the vehicle are completely seated and, if not, returns to step 118. If the users in the vehicle are completely seated, routine 100 proceeds to step 122 to move the steering wheel or column into a drivable position. Next, the control routine 100 proceeds to step 124 to perform the same procedure during egress when the user exits the vehicle before ending at step 126.

Accordingly, the vehicle 10 advantageously provides for a sensing arrangement and deployable steering wheel assembly 30 that deploys the steering wheel 32 to a position depending on the sensed characteristics of a user. This advantageously allows for an optimal placement of the steering wheel assembly 30 to allow a user to enter or exit the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a cabin interior;
   a steering wheel assembly comprising a steering column, a steering wheel and an actuator configured to move the steering handle amongst a plurality of positions;
   at least one sensor for sensing a user proximate to the vehicle and generating sensed data based on the sensed user; and
   a controller determining one or more characteristics of the user from the sensed data and controlling the actuator to actuate the steering wheel to one of the plurality of positions based on the determined one or more characteristics of the user, wherein the steering wheel is actuatable towards and away from a door opening of the vehicle, and wherein the steering wheel is actuatable towards a door opening of the vehicle that is a driver's door proximate to a driver's seat to assist a driver entering the vehicle or is actuatable towards a passenger door to provide an assist handle to assist a passenger entering the vehicle.

2. The vehicle of claim 1, wherein the steering wheel is actuatable along a lateral axis of the vehicle.

3. The vehicle of claim 2, wherein the actuator comprises a motor.

4. The vehicle of claim 1, wherein the steering wheel is further actuatable to rotate laterally relative to the steering column.

5. The vehicle of claim 4, wherein the steering wheel rotates approximately 90° about a vertical axis.

6. The vehicle of claim 1, wherein the steering wheel is further actuatable to move longitudinally along an axis of the steering column and tilt about the lateral axis to move the steering wheel to positions at different heights.

7. The vehicle of claim 1, wherein the at least one sensor comprises at least one imaging camera.

8. The vehicle of claim 7, wherein the at least one imaging camera captures images of a user proximate to the vehicle and the controller processes the images and determines the characteristics of the user from the images.

9. A vehicle comprising:
   a cabin interior;
   a steering wheel assembly comprising a steering column, a steering wheel and an actuator configured to move the steering handle amongst a plurality of positions;
   at least one sensor for sensing a user proximate to the vehicle and generating sensed data based on the sensed user; and
   a controller determining one or more characteristics of the user from the sensed data and controlling the actuator to actuate the steering wheel to one of the plurality of positions based on the determined one or more characteristics of the user, wherein the determined one or more characteristics of the user include one or more measured dimensions of the user, and wherein the one or more measured dimensions of the user include length of an arm of the user.

10. A method of positioning a steering wheel in a vehicle, the method comprising:
    providing a steering wheel assembly having a steering wheel configured to be engaged by a user to steer the vehicle, the steering wheel further comprising a steering column and an actuator for actuating the steering wheel into one of a plurality of positions;
    sensing a user proximate to the vehicle with at least one sensor generating sensed data;
    determining one or more characteristics of the user from the sensed data; and controlling the actuator to actuate the steering wheel to move to one of the plurality of positions based on the determined one or more characteristics of the user, wherein the steering wheel is further actuated to rotate laterally relative to the steering column.

11. The method of claim 10, wherein the steering wheel is actuatable along a lateral axis of the vehicle.

12. The method of claim 11, wherein the steering wheel is actuatable towards and away from a door opening of the vehicle.

13. The method of claim 12, wherein the steering wheel is actuatable towards a driver's door proximate to a driver seat to assist a driver entering the vehicle.

14. The method of claim 12, wherein the steering wheel is actuatable towards a passenger door to provide an assist handle to assist a passenger entering the vehicle.

* * * * *